Aug. 25, 1942.　　　　R. W. JOHNSON　　　　2,293,903
COMPENSATING VALVE ACTUATING MECHANISM
Filed Nov. 12, 1940　　　　2 Sheets-Sheet 1

INVENTOR
ROY W. JOHNSON
BY John W. Michael
ATTORNEY.

Aug. 25, 1942.  R. W. JOHNSON  2,293,903
COMPENSATING VALVE ACTUATING MECHANISM
Filed Nov. 12, 1940   2 Sheets-Sheet 2

INVENTOR
ROY W. JOHNSON.
BY John W. Michael
ATTORNEY.

Patented Aug. 25, 1942

2,293,903

UNITED STATES PATENT OFFICE 2,293,903

COMPENSATING VALVE ACTUATING MECHANISM

Roy W. Johnson, Milwaukee, Wis.

Application November 12, 1940, Serial No. 365,261

12 Claims. (Cl. 137—21)

This invention relates to a constant level oil control device of the type interposed between a reservoir and a burner, and wherein the liquid fuel flows by gravity and under the regulation of a metering valve to the burner, and the present invention is more particularly concerned with the valve-actuating and control mechanism for the metering valve.

Oil control devices of this character, as commonly used, have a liquid supply chamber in which a predetermined level of liquid fuel is maintained by means of a float-controlled inlet valve. The outlet of the supply chamber is connected to the burner and flow through the outlet is regulated by means of the metering valve. The metering valve is usually adjustable so as to provide for a pilot or low fire, a high fire, and in many instances for intermediate flames or fires. The metering valve is controlled to provide the desired height of flame in the burner by either manual or thermostatic means, and sometimes both are interchangeably used in the same unit. The manual control usually comprises in general a manually operable control knob acting through a cam or other similar means to move the metering valve toward and away from its seat. Thermostatic controls usually comprise a room thermostat regulating the energization of an electric heating element combined with a heat motor, such as a bi-metallic leaf, whose flexure regulates the position of the valve.

Precision control of the flow of oil further requires that provision be made for variations in the flow of the oil consequent upon changes in its viscosity due to temperature changes. Changes in oil viscosity incident to temperature changes may be the result of changes in the ambient temperature of a metering valve and of the control unit, or upon the temperatures to which the oil is subjected in its storage tank and in the supply line leading from the storage tank to the control device.

An object of the present invention is to provide an oil control device of the character mentioned, which is provided with a novel metering valve-actuating and control mechanism, one that is responsive either to manual or thermostatic control, one which automatically compensates for changes in the viscosity of the oil due to temperature changes, and one which provides for a wide and varied range of metering valve adjustments from complete shut-off through low and intermediate to high fires, and which, when completely shutting off flow, does so in such manner as not to stress, distort, or otherwise impair the capacity of the compensating elements of the structure to exercise their compensating function upon movement of the valve to positions other than complete shut-off.

A further object of the invention is to provide a valve-actuating mechanism of this character and having these advantages, and which is simple, closely organized, and compact in construction, reliable, efficient and safe in operation, and easy and comparatively inexpensive to manufacture.

The present invention is in the nature of an improvement on the devices shown in my application for "Conversion oil control devices," filed April 4, 1940, Ser. No. 327,789, and my application for "Temperature compensating metering valve," filed July 22, 1940, Ser. No. 346,751.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1:
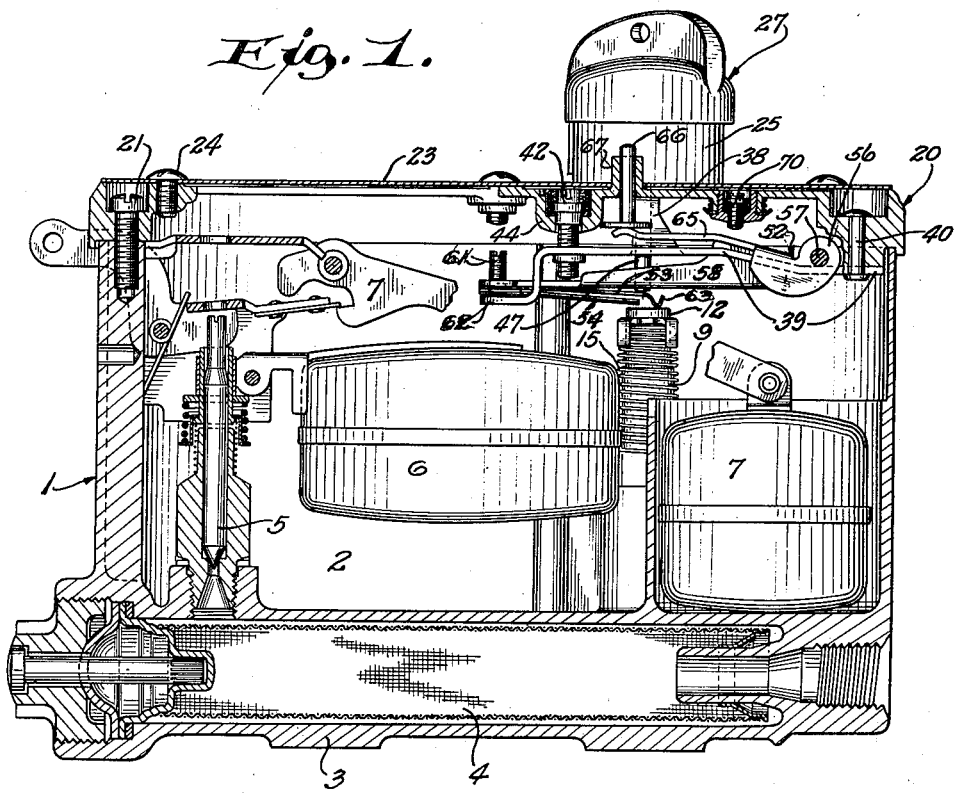
Figure 1 is a view partly in vertical, longitudinal cross section and partly in side elevation, showing a constant level oil control device embodying the present invention, the metering valve of the device being illustrated in fully closed or shut-off position.
Figure 3:
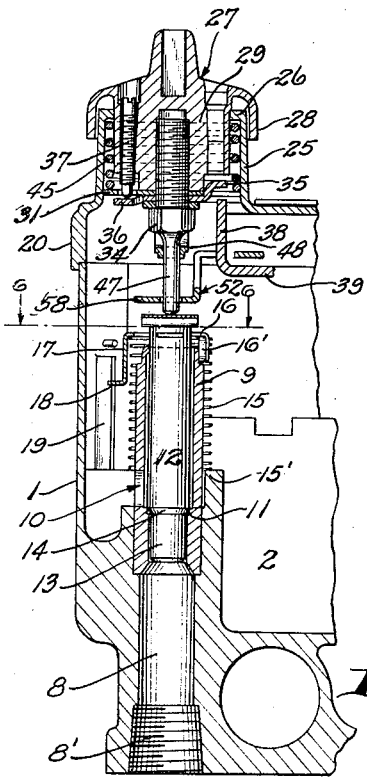
Figure 3 is a view in transverse, vertical, cross section taken through the manually adjustable control knob, the metering valve and the metering valve guide and associated parts, but illustrating the metering valve and other elements of the structure in elevation for the sake of illustration.

Referring to the drawings, and more particularly to Figures 1 and 3, it will be seen that an oil control device embodying the present invention comprises a casing, designated generally at 1, and having a main liquid supply chamber 2 therein. Liquid fuel is supplied through an inlet 3 equipped with a strainer 4 to an inlet valve 5 controlled by a main float 6 so that a constant level of liquid fuel is maintained in the supply chamber 2. A safety shut-off mechanism, designated generally at 7, is combined with the means for maintaining the predetermined level of liquid in the main supply chamber 2 in the manner fully described and claimed in my United States Letters Patents 2,068,138, granted January 19, 1937, and 2,120,364, granted June 14, 1938.

The liquid flows out of the main supply chamber 2 through one or more outlets, only one being shown in the drawings and being designated at 8 (see Figure 3). The outlet passage 8 has its lower end internally threaded as at 8' to adapt it to be connected to a pipe line which leads to the burner, neither of which is shown.

A tubular valve guide 9 has its lower end press-fitted or otherwise suitably secured in the upper portion of the outlet passage 8, the valve guide extending vertically in the casing and terminated a short distance below the upper end of the casing. The tubular valve guide 9 is provided with a lateral opening or port 10, which provides for communication between the interior of the valve guide 9 and the liquid supply chamber 2. Just below this port 10 the guide 9 has an internal valve seat 11 machined therein. A metering valve 12 is slidably fitted in the guide 9 for vertical movement and has its lower end 13 reduced and slotted and designed to coact with the valve seat 11 and with the internally restricted lower end of the valve guide 9 to meter the flow of oil from the liquid supply chamber 2 to the outlet passage 8 and consequently to the burner. The metering valve 12 also has a beveled portion 14 which snugly engages the beveled valve seat 11 of the valve guide in the fully closed position of the metering valve to shut off all flow to the burner.

Means is provided for biasing the metering valve 12 to open position and may conveniently take the form of an expansible coil spring 15 having its lower end engaging an abutment 15' provided on the casing and having its upper end engaging the under side of the yoke-like collar or abutment 16. The arms of this yoke-like collar 16 straddle the upper end of the metering valve and have portions of their inner edges interfitted with shallow slots provided in the peripheral portion of the metering valve, and are further soldered or suitably secured in position. The outer ends of the arms of this yoke 16 are provided with depending retaining fingers 16' which engage the outer surfaces of the upper convolutions of the coil spring 15 to hold the spring in proper engagement with the yoke-like collar or abutment 16. The body of the yoke is provided with a rather long depending finger 17 which assists the finger 16' in retaining the spring in place, and which in addition has an outturned lug 18 at its lower end slidably interfitted with guide ribs 19 formed integral with the housing 1 to constrain the metering valve 12 to vertical sliding movement and to hold it in rotation. A stop pin 19' is carried by the casing in between and just above the guide ribs 19 and in the path of travel of the guide lug 18 so as to be engageable with the lug and prevent the valve 12 from jumping out of its guide 9 under the influence of its spring 15 when the cover frame and valve-actuating mechanism, hereinafter to be described, are removed from the casing 1.

Applied to the upper open end of the casing 1 is a cover frame, designated generally at 20. The marginal portion of this frame 20 is interfitted with and releasably secured to the body of the casing 1 by a suitable number of screws 21. The portion of the frame 20 that overlies the metering valve 12 has a transversely extending and horizontally disposed web 22 cast integral therewith and formed with suitable openings and appropriately shaped and fashioned to accommodate and support the various elements to be hereinafter described. The closure at the top of the control device is completed by the provision of a suitable name-plate or cover-plate 23, which is releasably secured in position by a suitable number of screws 24.

Figure 5:
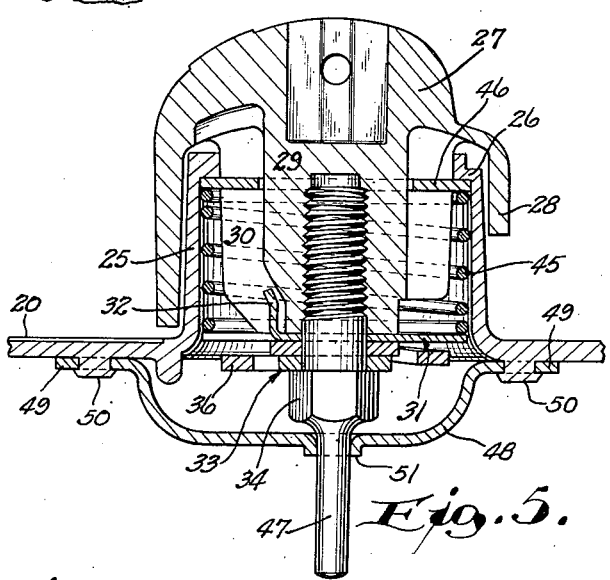
Figure 5 is a detail sectional view taken on line 5—5 of Figure 4.

The portion of the web 22 of the cover frame, which directly overlies the metering valve 12, is provided with an integral upstanding sleeve 25 formed at its upper end with an internal annular flange 26 (see Figures 3 and 5). A manually operable control knob for the metering valve, designated generally at 27, is rotatably interfitted with the upper end of this sleeve 25, and for this purpose has a depending annular flange or skirt 28 which rotatably fits over the upper end portion of the sleeve 25. The knob 27 has an integral, reduced central or body portion 29 which extends down into the sleeve 25. The body portion 29 of the knob is formed with a key slot 30 to adapt it to be rotatably coupled to a washer 31, the washer being fitted against the lower end of the body portion 29 and having an upwardly directed driving lug or key 32 integral therewith and interfitted with the key slot 30. A rotary cam 33 has its hub portion applied to the under face of the washer 31, and both the washer 31 and the cam 33 are secured to the body portion by means of a stud 34, the shank of which is threaded into the body portion 29 and the head of which abuts the under side of the hub of the cam.

The cam 33 is provided with an upwardly directed lug 35 which fits in a slot or notch in the washer 31 to rotatively couple the cam and washer. The disk or plate which constitutes the cam 33 is slotted to provide an adjustable cam strip 36 capable of flexure to vary the throw of the cam. The extent of flexure of the cam strip 36 is determined by the adjustment of a screw 37 threaded into the body of the knob and having its lower rounded edge bearing down on the cam strip 36. The details of the construction of the cam per se forms no part of the present invention and are more fully disclosed in U. S. Patent No. 2,244,161, issued June 3, 1941, to Roy W. Johnson.

In the assembly the active face of the cam 33 rides on an abutment lug 38, which is integral with and upstands from an adjustable supporting arm 39. By supporting the lug 38 on the adjustable arm 39 it is practical and convenient to compensate the variations in grades in fuel oil. This compensation is had by constituting the arm 39 of stiffly resilient metal and riveting one end of it, as at 40, to the cover frame 20. Adjacent its opposite end the arm 39 is formed with an internally threaded bearing 41. An adjusting screw, designated generally at 42, has a swivel connection 43 with a socket 44 provided therefor in the web 22 of the cover frame, and is threadedly interconnected with the bearing 41 of the arm 39. The top of the screw 42 is cross slotted, and when the cover plate 23 is removed, is accessible for adjustment by means of a screwdriver or other suitable tool. By turning the screw 42 the supporting arm 39 is flexed upwardly or downwardly, depending upon the direction in which the screw 42 is turned, thereby raising or lowering the abutment 38 for the cam 33.

A coil spring 45 encircles the body portion 29 of the knob 27 and its upper end abuts an antifriction washer 46, which in turn abuts against the inturned flange 26 of the sleeve 25. The lower end of the coil spring 45 abuts the washer 31 and forces the entire knob assembly and active face of the cam 33 downwardly so as to cause the cam to press against the abutment 38 in all adjustments of the knob 27.

With this construction, by turning the knob 27 the active face of the cam 33 will ride on the rounded upper end of the abutment lug 38, and consequently the knob assembly, including the stud 34, will be shifted upwardly or downwardly depending upon the direction in which the knob is turned.

The stud 34 is provided with an integral depending pin or stem 47, which is in vertical alinement with the top of the metering valve 12, and the range of the vertical adjustment of the stem, which is controlled of course by the throw of the cam 33, is such that the lower end of the stem 47 may be effective to control the position of the metering valve 12, or in some adjustments the stem 47 may be so far elevated as to leave the control of the metering valve to the thermostatic means that may be combined with the unit.

For the purpose of guiding and steadying the stem or pin 47, thereby enabling it to better exercise its control of the metering valve 12, a bowed guide strip 48 is provided, and has its upwardly offset ends 49 suitably secured, as at 50, to the web 22, and has its central portion formed with the flanged guiding opening 51 through which the pin or stem 47 slides.

Figure 2:
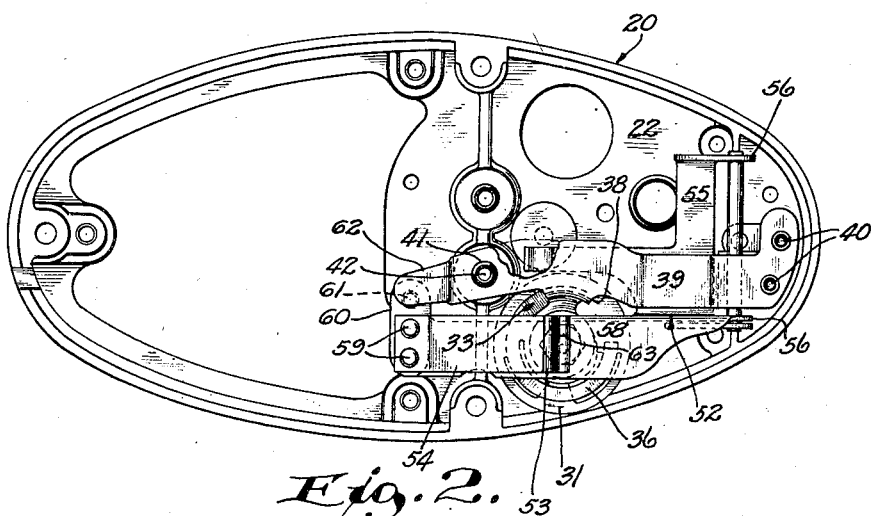
Figure 2 is a view in bottom plan of the cover frame of the device and illustrating the valve-actuating mechanism carried thereby.
Figure 6:
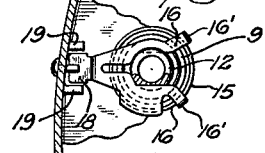
Figure 6 is a view in horizontal cross section taken on line 6—6 of Figure 3 and illustrating the yoke-like abutment and guide which coacts with the outer end of the metering valve and with its biasing spring.
Figure 4:
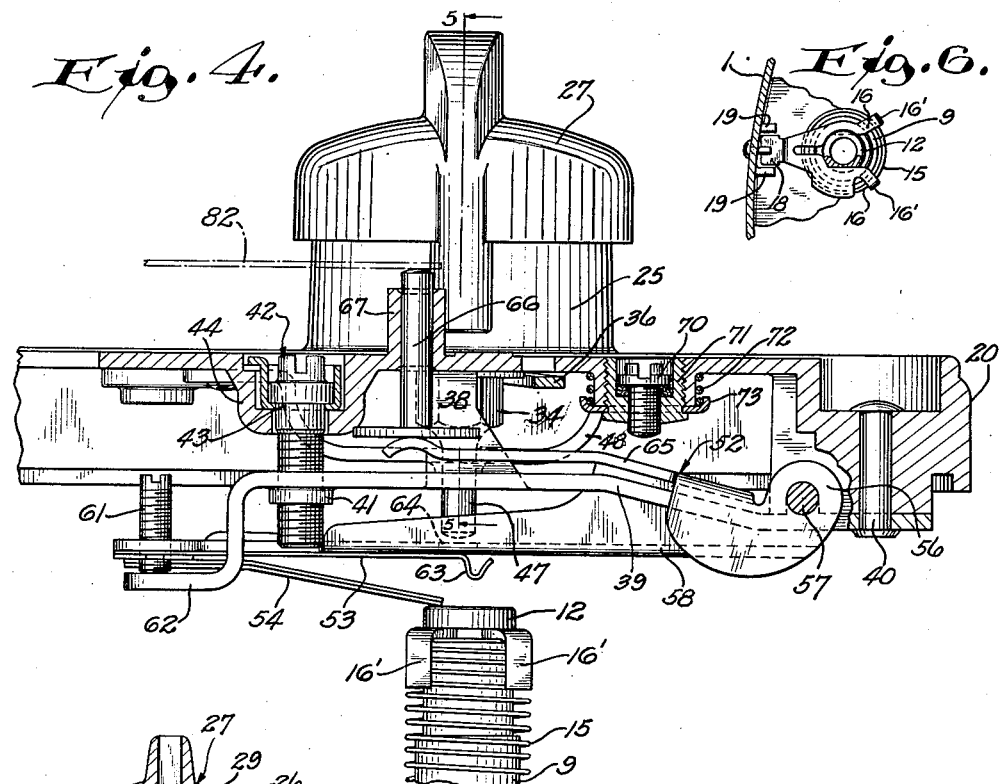
Figure 4 is a fragmentary view on an enlarged scale similar to Figure 1 but illustrating the manually operable control knob turned to a position wherein the unit may be responsive to thermostatic control.

The pin or stem 47, as well as the thermostatic control to be hereinafter described, both exert their control over the metering valve through a valve-actuating mechanism comprising generally a valve-operating lever indicated as a whole at 52, a spring strip 53, and a bimetallic leaf 54. The valve-operating lever 52 is preferably fashioned from sheet metal and is formed at one end with a lateral enlargement 55 provided with integral, apertured pivot ears 56 through which a pivot pin 57 extends, the pivot pin yoke 7 being suitably supported on the cover frame 20 and serving as a pivotal mounting or fulcrum for the lever 52. The lever 52 has an arm 58 of angular cross section with the vertical flange of the angle tapered as shown, and with the horizontal flange flat and of the configuration shown in Figure 2. The spring strip 53 and bimetallic leaf 54 have their outer ends riveted, as at 59, to the outer end of the arm 58 of the lever 52.

The outer end of the horizontal flange of the arm 58 of the lever 52 is provided with a lateral enlargement 60 which has a threaded opening therein receiving a low fire stop screw 61, the stop screw 61 engaging an abutment or seat provided by a downwardly offset extension 62 of the supporting arm 39 to determine the low or pilot fire position of the metering valve 12 correctly, as will now be described, so as to compensate for variations in oil viscosity due to temperature changes.

In the assembly the strip 53 is tensioned so as to engage flush up against the under side of the horizontal flange of the arm 58 of the lever 52 for substantially its entire length. The free end of this spring strip has a V-shaped formation 63 therein which is designed to engage the upper end of the metering valve 12 under certain conditions and in certain adjustment of the valve-actuating mechanism.

The bimetallic sleeve 54 is so set that it is engageable with a portion of the top of the metering valve 12 in all positions of the valve excepting fully closed or shut-off position thereof (see Figure 1).

The horizontal flange of the arm 58 of the lever 52 is provided with an opening 64 in vertical alinement with the lower end of the stem or pin 47 of the stud 34 so that when the knob 27 is adjusted to exercise manual control over the metering valve 12 the lower end of the pin or stem 47 will project through the opening 64 and bear against the spring strip 53 adjacent the V shape formation 63 thereof. The spring strip 53 is sufficiently stiff so that the knob and its stem 47 can adjust the metering valve over its range of adjustment without flexure of the strip 53 relative to the lever arm 58 except for the fully closed position of the valve. In the fully closed or shut-off position of the valve the low fire stop screw 61 engages the seat 62 provided by the angular extension of the supporting arm 39 so that further downward swinging movement of the lever 52 is arrested. Consequently, the further downward movement of the stem 47 flexes the strip 53 relative to the horizontal flange of the arm 58 of the lever 52, in a manner illustrated in Figure 1, to completely close the shut-off metering valve 12. In all except the fully shut-off position, however, the adjustment of the knob, acting through the stem 47, and applied by strip 53 to the metering valve 12, is modified by the action of the bimetallic leaf 54, which flexes in response to changes in temperature to so shift the valve 12 as to compensate for variations in oil viscosity due to temperature changes.

The valve-operating lever 52 also has a second lever arm 65 integral with the laterally extending body of the lever, and is horizontally disposed. The outer end of the arm 65 of the lever 52 engages the lower headed end of an operating pin 66, which is slidably fitted in a bearing 67 provided therefor on the web 22 of the cover frame.

In order to control the high fire position of the valve, when it is subjected to thermostatic control, a high fire stop in the form of an adjustable screw 70 is provided, the screw 70 being threaded through the lower end of a bushing 71 adjustably mounted on the web 22 by virtue of its threaded connection thereof. The bushing 71 is releasably secured in various adjustments by a spring 72 bearing against the under side of the web and against the flanged washer 73 carried by the flanged lower end of the bushing. The lower rounded end of the screw overlies the arm 65 or lever 52 and limits the extent to which it may be swung upwardly thereby determining the high fire position of the valve 12 when the device is equipped with a thermostatic control unit.

The details of the thermostatic control unit per se form no part of the present invention and are fully disclosed in my application for "Conversion oil control devices," filed April 4, 1940, Serial No. 327,789. It is sufficient to understand that such a thermostatic control device comprises a heat motor, such as a bimetallic leaf, indicated diagrammatically at 82, and which is responsive to the control of a room thermostat.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A control device of the character described comprising a casing having a liquid supply chamber provided with an outlet, a metering valve for regulating flow through said outlet, means for biasing said valve to open position, a swingable valve-operating lever overlying the valve, an adjustable actuating element for said lever, a stiffly resilient motion transmission member carried by said lever and with which said actuating element is directly engageable, said motion transmission member also being cooperable with the valve, a low fire stop engageable with the lever to limit the swinging movement thereof in a direction to cause the motion transmission member to move the valve toward closed position, said actuating element being adjustable to flex said member and move the valve to fully closed position after said lever has engaged said stop, and a bimetallic leaf having one end secured to the lever and having its other end spaced therefrom and from said member and engageable with the valve to vary automatically the action thereof to compensate for changes in the viscosity of the oil due to changes in temperature in all open positions of the valve, said bimetallic leaf remaining spaced from said member and being also spaced from the valve in the fully closed position thereof.

2. A control device of the character described comprising a casing having a liquid supply chamber provided with an outlet, a metering valve for regulating flow through said outlet, means for biasing said valve to open position, valve-actuating mechanism cooperable with the valve to control its position and including a swingable valve-operating lever overlying the valve, and temperature compensating means carried by said lever and interposed between the lever and the valve to vary automatically the action of the valve so as to compensate for changes in the viscosity of the oil due to changes in temperature.

3. A control device of the character described comprising a casing having a liquid supply chamber provided with an outlet, a metering valve for regulating flow through said outlet, means for biasing said valve to open position, a swingable valve-operating lever overlying the valve, a spring strip interposed between the lever and the valve and having one end portion fixed to the lever, said strip having a portion engageable with the valve to transmit motion thereto, a valve operator engageable with the strip, and a bimetallic leaf also carried by the lever and interposed between the lever and the valve and cooperable with the valve to vary automatically the action of the valve to compensate for changes in the viscosity of the oil due to changes in temperature in all open positions of the valve.

4. A control device of the character described comprising a casing having a liquid supply chamber provided with an outlet, a metering valve for regulating flow through said outlet, means for biasing said valve to open position, valve-actuating mechanism cooperable with the valve to control its position and including a swingable valve-operating lever overlying the valve, and a bimetallic leaf carried by said lever and having a portion interposed between the lever and the valve and operable on the valve to vary automatically the valve action so as to compensate for changes in the viscosity of the oil due to changes in temperature.

5. A control device of the character described comprising a casing having a liquid supply chamber provided with an outlet, a metering valve for regulating flow through said outlet, means for biasing said metering valve to open position, a swingable valve-operating lever overlying the valve, a spring strip carried by the under side of the lever and engageable with the metering valve to transmit motion from the lever to the valve, and a bimetallic leaf also carried by the lever and having a portion interposed between the lever and the valve and engageable with the valve to automatically compensate for changes in the viscosity of the oil due to temperature changes.

6. A control device of the character described comprising a casing having a liquid supply chamber provided with an outlet, a metering valve for regulating flow through said outlet, means for biasing said valve to open position, a swingable valve-operating lever overlying the valve and having an opening therethrough, a spring strip having one end fixed to the under side of the lever and having a downwardly offset end adjacent the opening in the lever and engageable with a portion in the top of the valve, an operator projecting through the opening in the lever and engageable with said strip to control the position of the lever and of the strip, and a bimetallic leaf also carried by the under side of the lever and engageable with the top thereof to automatically vary the action of the valve to compensate for changes in the viscosity of the oil due to changes in temperature.

7. A control device of the character described comprising a casing having a liquid supply chamber provided with an outlet, a metering valve for regulating flow through said outlet, means for biasing the metering valve to open position, a manually operable control knob mounted on the casing above said valve, cam means actuated by said knob, a swingable valve-operating lever interposed between the cam means and the valve, a spring element carried by the lever and transmitting the motion of the cam means to the lever and also the motion of the lever to the valve, and a bimetallic leaf carried by the lever and engageable with the valve to automatically compensate for changes in the viscosity of the oil due to temperature changes.

8. A control device of the character described comprising a casing having a liquid supply chamber provided with an outlet, a metering valve for regulating flow through said outlet, means for biasing the valve to open position, valve-actuating mechanism cooperable with the valve to control the position thereof and including a swingable valve-operating lever overlying the valve, an actuating element for said operating lever, a stiffly resilient motion transmission member carried by said valve-operating lever and engageable with the valve, a low fire stop engageable with said lever to limit the extent to which it may swing in a direction to move the valve toward closed position, said actuating element being operable upon engagement of said lever with said stop to flex said stiffly resilient motion transmission member and move the valve to fully closed position.

9. A control device of the character described comprising a casing having a liquid supply chamber provided with an outlet, a metering valve for regulating flow through said outlet, means for biasing said valve to open position, valve-actuating mechanism cooperable with the valve to control its position and including a swingable valve-operating lever having two arms, one of said lever arms overlying the valve, a low fire stop combined with the lever arm overlying the valve, a high fire stop cooperable with the other of said lever arms, two sets of operators for the valve-operating lever, one being in cooperative relation with the lever arm overlying the valve and the other cooperable with the other of said lever arms, a spring strip carried by the lever arm overlying the valve and directly cooperable with its associated operator, and a bimetallic leaf also carried by the lever arm overlying the valve and engageable with the valve to vary automatically the valve action so as to compensate for changes in the viscosity of the oil due to temperature changes.

10. An oil control device of the character described comprising a casing having a liquid supply chamber provided with an outlet, a metering valve for regulating flow through said outlet, means for biasing the valve to open position, a manually operable control knob mounted on the casing, cam means actuated by said knob, an abutment lug for said cam means, a supporting strip of stiffly resilient metal carrying said lug, said supporting strip having one end fixed to the casing, an adjusting screw mounted on the casing and threadedly interconnected with the strip so as to flex the strip when forced and shift the abutment lug vertically, a valve-operating lever pivotally supported on the casing and controlled as to position by said cam means, a low fire screw threaded through the free end of the lever, said strip having a downwardly offset end providing an abutment against which said screw bears, a yieldable strip for transmitting the motion from the cam means to the valve-operating lever and to the valve, and a bimetallic leaf interposed between the lever and the valve.

11. A control device of the character described comprising a casing having a liquid supply chamber provided with an outlet, a tubular valve guide combined with said outlet, a metering valve slidable in said guide, a coil spring having one end abutting the casing, a combined guide and abutment for the other end of the spring connected to the metering valve and having retaining fingers embracing the spring, one of said fingers being elongated and provided with an outturned guide lug, said casing having a guideway in which said guide lug is slidably fitted, and valve-actuating mechanism for controlling the position of said metering valve.

12. A control device of the character described comprising a casing having a liquid supply chamber provided with an outlet, a metering valve for regulating the flow through said outlet, means constraining said metering valve to rectilinear movement and biasing it to open position and including a coil spring having one end abutting the casing, and a combined guide and abutment carried by the valve and engaging the other end of said spring, said casing having a guideway cooperable with the guiding element of said combined guide and abutment to constrain it and the valve to rectilinear motion.

ROY W. JOHNSON.